Sept. 29, 1959    E. L. MYRICK ET AL    2,906,226
APPARATUS FOR ALIGNING PIPE ENDS
Filed July 17, 1957    2 Sheets-Sheet 1
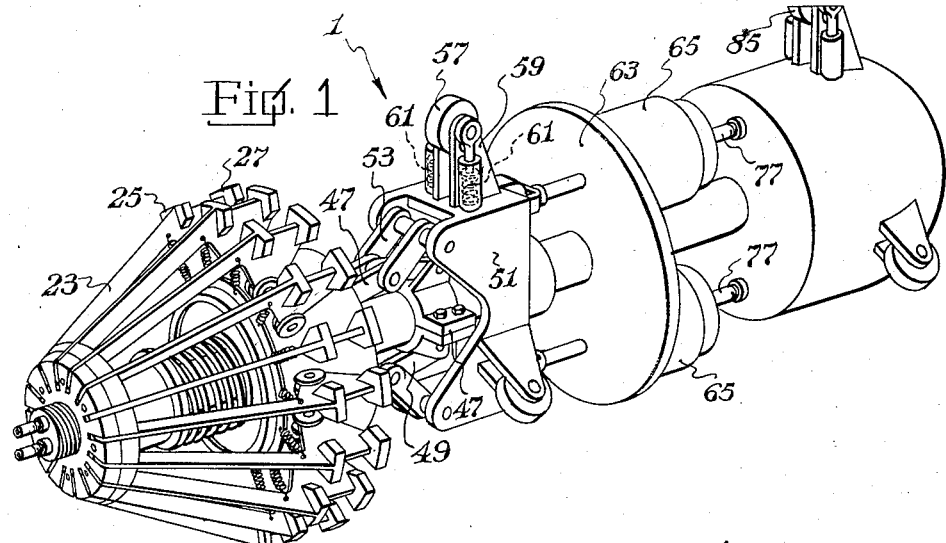
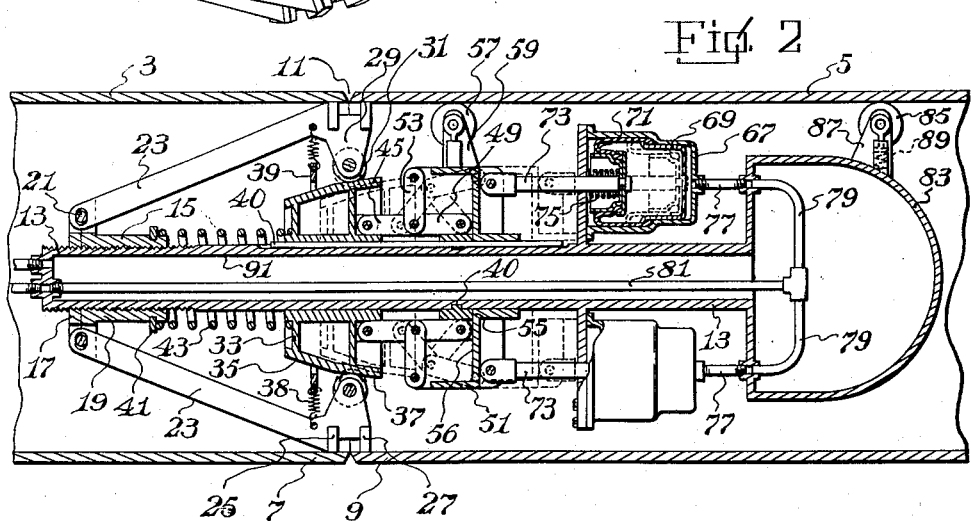
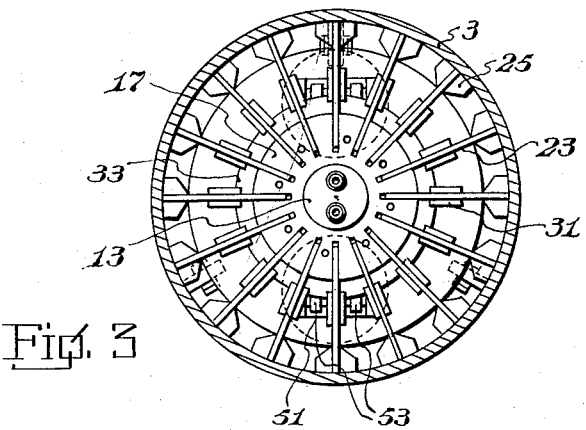
Elvin L. Myrick
Julius Clark
INVENTOR.
BY Robert J. Pam
ATTY Sept. 29, 1959  E. L. MYRICK ET AL  2,906,226
APPARATUS FOR ALIGNING PIPE ENDS
Filed July 17, 1957  2 Sheets-Sheet 2

Elvin L. Myrick
Julius Clark
INVENTOR.

BY Robert J. Patin
ATTY

United States Patent Office 2,906,226
Patented Sept. 29, 1959

2,906,226

APPARATUS FOR ALIGNING PIPE ENDS

Elvin L. Myrick, Tulsa, and Julius Clark, Broken Arrow, Okla., assignors to Pipeliners Manufacturing Company, Inc., Tulsa, Okla., a corporation Application July 17, 1957, Serial No. 672,422

9 Claims. (Cl. 113—103)

The present invention relates to apparatus for aligning pipe ends, and more particularly for aligning in closely contiguous relationship the ends of a plurality of end-to-end pipe sections.

In the construction of pipelines, a plurality of pipe sections are laid end-to-end, each successive section being butt welded to the immediately preceding section. In order to form a suitable base for the weld so that a fluid-tight connection will result, it is obvious that the pipe sections must be not only coaxial but also closely contiguous entirely about the peripheries of the adjacent ends of the sections to be welded together. Now, the large diameter pipe sections often used for pipeline construction are not precisely cylindrical even as manufactured; and during transportation to the job site and as a result of rough handling upon arrival, the pipe sections and more particularly the ends thereof often lose their circular contour.

Thus, it very often happens that when a pipe section is laid up endwise against its preceding section, the adjacent ends will be out of true to the point that it is useless to attempt a weld. Therefore, it is the usual practice to run a greatly enlarged mandrel into the line to align the ends to be welded together. These devices are known as "lineup clamps" and function in the manner of welding jigs or fixtures not only to align the parts prior to welding but to maintain them in aligned position during welding.

Such lineup clamps have long been known to the art; but the ones known heretofore have suffered from a great many disadvantages. For example, lineup clamps as proposed heretofore have not been able, within the confined space afforded by the interior of a pipeline, to exert sufficiently great pressure upon the adjacent ends to deform them into congruity. Also, certain prior lineup clamps tended to exert components of axial force upon one or another of the pipe sections to be welded together, with the result that the adjacent ends were either moved apart or rammed together. Moreover, the lineup clamps known to the prior art could not readily be deactivated for movement to the next forward weld, could not be easily manipulated from a distance the length of a pipe section, were expensive to build, costly to maintain and difficult to operate.

Although a number of attempts were made to overcome the foregoing and other disadvantages of the prior art, none, as far as is known, was entirely successful when carried out commercially on an industrial scale.

Accordingly, it is an object of the present invention to provide apparatus for aligning pipe ends which will exert extremely strong aligning forces from within a pipeline.

Another object of the present invention is the provision of apparatus for aligning pipe ends which will exert no substantial component of force axially of the pipe sections.

The invention also contemplates the provision of apparatus for aligning pipe ends which may be quickly and easily disengaged for ready movement to adjacent a new weld.

Yet another object of the present invention is the provision of apparatus for aligning pipe ends which will be extremely compact in construction and which will exert a steady and dependable aligning force of constant magnitude.

A still further object of the present invention is the provision of apparatus for aligning pipe ends which may be readily operated from a distance at least the length of a pipe section of a pipeline.

Finally, the present invention has as its object to provide apparatus for aligning pipe ends which will be relatively inexpensive to manufacture, easy to position, operate, maintain and repair, and rugged and durable in use.

Other objects and advantages of the present invention will become apparent from a consideration of the following description taken in conjunction with the accompanying drawings in which:

Figure 1 is an isometric view of apparatus for aligning pipe ends according to the present invention;

Figure 2 is a longitudinal cross-sectional view of the apparatus of Figure 1, shown in operative position in a pipeline;

Figure 3 is a front end view corresponding to Figure 2;

Figure 4:
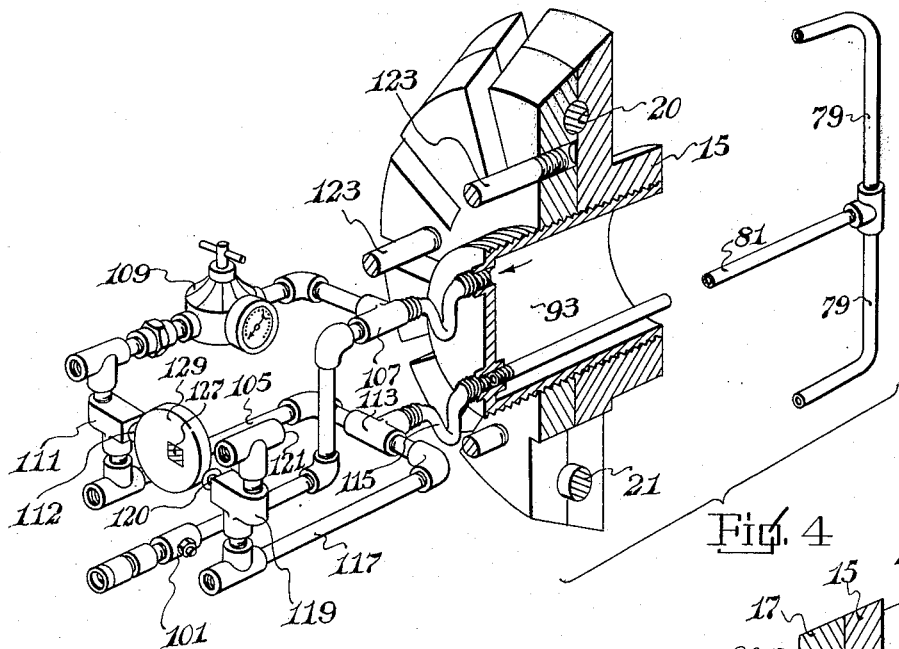
Figure 4 is a perspective assembly view, with parts omitted and parts broken away for clarity, of the front end of a device according to the present invention and illustrating particularly a major portion of the fluid power circuit.
Figure 5:
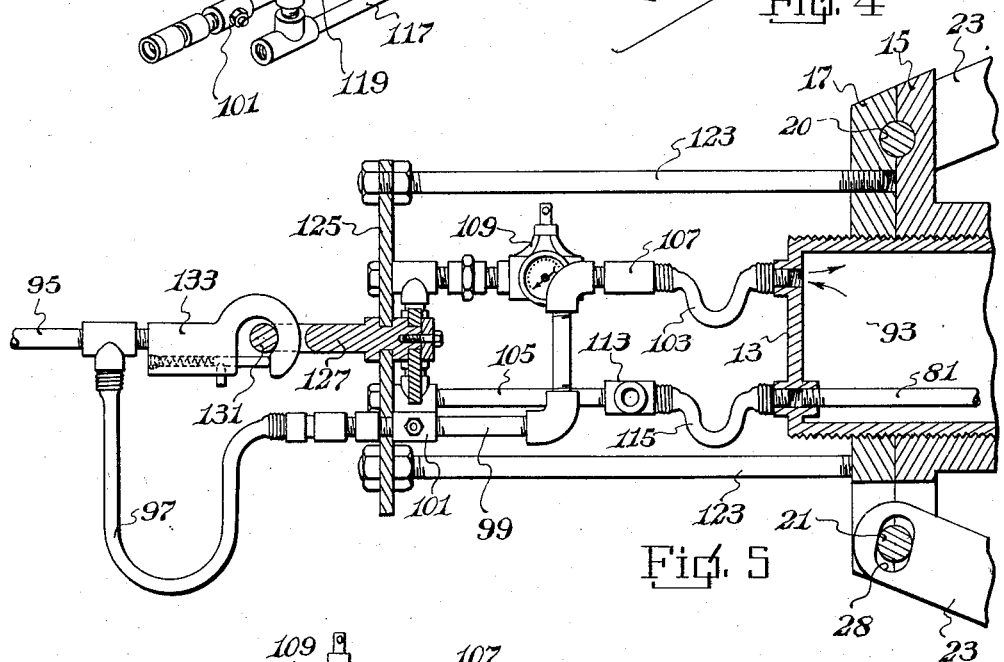
Figure 5 is an elevational view with parts in section, corresponding generally to Figure 4.

Referring now to the drawings in greater detail, there is shown apparatus for aligning pipe ends, indicated generally at 1, disposed in a pair of axially aligned end-to-end pipe sections 3 and 5 having their contiguous ends 7 and 9 beveled for the reception of weld metal.

The apparatus comprises a hollow central shaft 13 externally screw-threaded adjacent its forward end (which is the left end of the apparatus as seen in Figure 2) for the screw-threaded reception of an internally screw-threaded nosepiece 15 comprised of a pair of complementary sections 17 and 19 which together form a plurality of radially extending bearing ears. Sections 17 and 19 are provided in their mutually abutting faces with a plurality of opposed complementary semi-cylindrical recesses 20 which together form a plurality of cylindrical recesses for the reception of a plurality of pivot pins 21. Pivotally mounted on each pin 21 is a rigid expander arm 23 which extends from the pivotal mounting adjacent its forward end in an incline rearwardly and radially outwardly of shaft 13. Fixed to the rear and radially outer end of each arm 23 is a pair of expander feet 25 and 27 adapted to bear against the interior of contiguous ends 7 and 9, respectively, so that the plurality of feet 25 define in effect an expansible generally circular ring bearing against the inner periphery of end 7 and the feet 27 have the same function with regard to end 9. It is important to note that arms 23 receive pivot pins 21 in slots 28, so that sufficient play is afforded the forward end of each arm 23 to enable equalization of compressive loads between feet 25 and 27. At their rear ends, arms 23 also have radially inwardly extending ears 29 providing mountings for rollers 31.

Surrounding and longitudinally slidable on shaft 13 is an annular sleeve 33 having a radially outer surface which is generally conical in configuration and which is inclined radially outwardly rearwardly. It should especially be noted that this surface of sleeve 33 has a relatively steeply inclined forward portion 35 and a relatively gently inclined rear portion 37. Secured to a rear portion of each arm 23 is a tension spring 38 which extends radially inwardly and is secured at its inner end to a ring 39 which encircles but is spaced from both shaft 13 and sleeve 33 and is supported solely by springs 38. Thus, the assembly of springs 38 and ring 39 continuously urges all arms 23 radially inwardly about their forward pivots.

Fixed longitudinally of shaft 13 is a radially extending key 40 disposed in a complementary keyway formed in the interior surface of sleeve 33, to restrict movement of sleeve 33 to longitudinal sliding movement only and to prevent relative rotation of shaft 13 in sleeve 33. Mounted on nosepiece 15 is an annular abutment shoulder 41; and a coil compression spring 43 encircles shaft 13 and acts between shoulder 41 and the forward end of sleeve 33 continuously to urge sleeve 33 rearwardly.

Pivotally mounted at their forward ends on the rear of sleeve 33 is a plurality of links 45. Fixedly secured on shaft 13 to the rear of sleeve 33 is a mounting and abutment ring 47 which is also keyed to shaft 13 by means of key 40 and which may be made sectional for easy assembly, as shown in Figure 1. Pivotally mounted at their rear ends on ears integral with ring 47 is a plurality of links 49 each of which is pivotally connected at its forward end by means of a pivot pin to the rear end of a link 45. A box-like collar 51 encompasses and slides longitudinally on shaft 13 to the rear of ring 47 and carries at its forward end pivotal mountings for the radially outer ends of a plurality of links 53 which at their radially inner ends are pivotally interconnected with the pivotal interconnecting means of links 45 and 49. Links 45 and 49 thus comprise collapsible linkages actuable through links 53 by collar 51 upon longitudinal sliding movement of collar 51. It should also be noted that links 45 and 53 in the illustrated embodiment are each comprised of a pair of link bars, the term "link" as used in this application comprehending not only a single link bar as shown for example in the case of link 49, but also a plurality of such bars or similar structure associated with each linkage. Thus, it will be seen that links 45, 49 and 53 transmit longitudinal movement of collar 51 in decreased magnitude to sleeve 33, and hence in increased force. Thus, the train of mechanism between and including expander feet 25, 27 and collar 51 comprises force applying means for applying radially outwardly directed force to ends 7 and 9.

It is especially important to note that the rear of abutment ring 47 provides a radially extending abutment face 55 against which a forwardly facing radial abutment face 56 on collar 51 abuts in the extreme forward position of collar 51. In this extreme forward position of collar 51, links 45 and 49 are at or very near dead center, but they have not yet passed over center. Thus, in the position of these links shown in full line in Figure 2, a small amount of tension in links 53 can break the linkage, but even a very great force applied rearwardly by sleeve 33 will fail to break the linkage.

Collar 51 is also keyed to shaft 13 by means of key 40 received in a complementary keyway in the interior surface of collar 51, thereby to permit only longitudinal sliding movement of collar 51 and to restrain collar 51 against rotation relative to shaft 13. Thus, collar 51 and sleeve 33 cannot rotate relative to each other nor relative to ring 47, with the result that links 45, 49 and 53 will always be maintained with their pivotal axes parallel to each other. Collar 51 is provided with three antifriction rollers 57 each mounted on a spider leg 59, the legs 59 being spaced 120 degrees apart, and one of the rollers 57 being resiliently urged radially outwardly by compression springs 61 so that all three rollers 57 will always be in contact with the interior of a pipe section.

Fixedly mounted on shaft 13 is a radially extending plate 63 disposed rearwardly of collar 51 and having horizontally mounted on its rear face a plurality of expansible chamber fluid motors 65 of the air boot type. Each motor 65 comprises a casing 67 closed at its forward end by plate 63 and having therein a retaining insert 69 apertured through its rear face for the flow of pressure fluid and retaining between its forward edge and the inner surface of casing 67 a flexible diaphragm 71. In connection with each motor 65, a piston rod 73 extends through plate 63 and is secured pivotally at its forward end to collar 51 and at its rear end to diaphragm 71 and is continuously urged rearwardly by a coil compression spring 75 encircling piston rod 73 and acting between plate 63 and an adaptor for diaphragm 71.

A conduit 77 communicates with the interior of each motor 65 and with a conduit 79, the other ends of conduits 79 being joined and communicating with a conduit 81, the conduits 77, 79 and 81 comprising conduit means extending lengthwise and interiorly of shaft 13. An air tank 83 communicates with the interior of shaft 13 and carries on its outer surface three rollers 85 mounted on spider legs 87, one of which rollers is urged radially outwardly by compression springs 89, all exactly as in the case of the rollers mounted on collar 51. It will be noted that rollers 57 and 85 and their associated mounting structures provide means for supporting shaft 13 coaxially in the pipeline under construction. The interior of air tank 83 and the interior of shaft 13 defined by the interior side walls 91 of the shaft together define an accumulator chamber 93 for use in the operation of motors 65. If shaft 13 were sealed off from air tank 83, and the latter used as the sole means defining an accumulator chamber, either much of the desirable accumulator volume would be lost, or else tank 83 would be cumbersome and unwieldy by virtue of its extremely large size. The same applies to the case in which air tank 83 would be eliminated and the interior of shaft 13 used as the sole accumulator. Thus, the advantage of employing both the interior of the shaft and the air tank as the accumulator will be apparent in that a device of the least diameter and least over-all length is thereby achieved.

To effect operation of motors 65, a fluid such as air is delivered under pressure from a conventional source of fluid pressure (not shown) through a rigid pipe 95, through flexible conduit 97, into rigid conduit 99 which in fact is comprised of a plurality of pipe sections and fittings and which includes a check valve 101 to prevent backflow of pressure fluid, through flexible conduit 103 and into accumulator chamber 93. When the pressure in chamber 93 has built up to operating pressure, input air flows through input conduit 105 by means of a T 107 disposed between the accumulator chamber and check valve 101, past a pressure regulator valve 109 having a dial face for indicating line pressure, and past an input control valve 111 which is of conventional construction and has a conventional operating plunger 112 which opens the valve in its depressed position and closes the valve in its extended position. The air in input conduit 105 then passes through a T 113, through flexible conduit 115 and to motors 65 through the conduit means comprised by conduits 81, 79 and 77. The exhaust from motors 65 leaves through this same conduit means, but of course in the reverse direction, the exhaust passing through flexible conduit 115, through T 113, and through an exhaust conduit 117 controlled by an exhaust control valve 119, the same as the valve 111 but having an oppositely directed operating plunger 120 which opens the valve when depressed and closes the valve when extended. The exhaust flowing past exhaust control valve 119 in its open position then exhausts to the atmosphere at 121.

It will be noted that the conduit system for pressure fluid input and exhaust extends forwardly of the forward end of shaft 13, and that in particular the conduit system 95—121 is disposed endwise forwardly of shaft 13. A supporting structure for this system is provided, comprising a plurality of bars 123 extending forwardly from and screw-threadedly received in nosepiece 15 and disposed parallel to the axis of shaft 13 in the form of a cage on the front end of which a plate 125 perpendicular to the axis of shaft 13 is secured. It will also be noted that plate 125 comprises a closure for certain portions of the conduit system at a plurality of points therein, as well as a support for the system. Specifically, input conduit 105 is supported and closed at two points by plate 125, as is also exhaust conduit 117, both as seen in Figure 4, in addition to the support of conduit 99 during passage through plate 125. Journaled in plate 125 coaxially of shaft 13 is a shaft 127 which at its rear end bears an eccentric cam 129 and at its forward end an eye 131 in which is engageable a hook 133 carried by rigid pipe 95.

The operation of the illustrated device according to the invention is as follows:

With apparatus 1 arranged as shown in Figure 2 relative to a pipe section 5 which has previously been welded to a pipeline and a pipe section 3 which has been laid up in end-to-end contiguous relation with section 5 and the parts as shown in broken line in Figure 2, the source of pressure fluid is actuated, whereupon pressure fluid flows through pipe 95 and into accumulator chamber 93 over the path previously described. Either before or after the accumulation of pressure in chamber 93, pipe 95 is turned in such a direction that hook 133 and with it shaft 127 and cam 129 are turned into the full line position shown in Figures 4 and 6 so that plunger 112 is depressed and input control valve 111 opened, thus permitting input pressure fluid to flow to the rear through the conduit means comprised by conduits 81, 79 and 77 to the inputs of motors 65. Thereupon, piston rods 73 are simultaneously forced forwardly and collar 51 moves forwardly until abutment faces 55 and 56 contact and the linkages are not quite over center as seen in Figure 2. At the same time, sleeve 33 has moved forward under the influence of the linkages a distance substantially less than the distance traveled by collar 51, the rollers 31 riding up along inclined portions 35 and 37 and expander feet 25 and 27 being forced powerfully into contact with the interiors of ends 7 and 9, respectively. It should be noted that the disposition of motors 65 about shaft 13 and the provision of a plurality of such motors provides a compact construction enabling the use of an accumulator of maximum volume disposed in a minimum amount of space, in combination with a total motor power of great magnitude with regard to the volume occupied by the motors. It should also be noted that the compressive forces exerted by piston rods 73 are multiplied twice before being applied to ends 7 and 9, the first time through the system of links 45, 49 and 53, and the second time by means of the inclined planes provided by portions 35 and 37 of the coacting surface of sleeve 33. It is especially important to notice that in the case of both of these multiplications of the applied force, the applied force increases as expander feet 25 and 27 move farther radially outwardly, so that the greatest applied force is available when it is most needed, that is, toward the end of the line-up operation. This is true because of the configuration of the link system 45, 49 and 53 whereby the linkage comprising links 45 and 49 is most nearly in line toward the end of the forward stroke and hence the multiplication of the force applied through links 53 is greatest at that time. Also, steeply inclined portion 35 of the surface of sleeve 33 provides a relatively rapid initial radially outward movement of expander feet 25 and 27, while gently inclined portion 37 of that sleeve surface provides a slower, more powerful outward movement of feet 25 and 27 toward the end of the outward movement thereof. Thus, it will be seen that maximum line-up power is available by use of the present invention.

Figure 6:
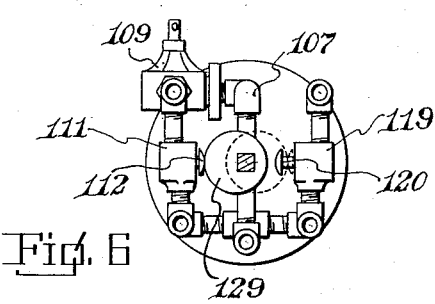
Figure 6 is a partial front end view of the structure shown in Figure 4.

The welding operation is then performed about groove 11; and when it is desired to release the device and move it to the next forwardly disposed location for a subsequent weld, it is necessary only to turn pipe 95 so that cam 129 is moved to the broken line position of Figure 6. Plunger 112 is thereby released and valve 111 controlling the input line closed, plunger 120 of exhaust control valve 119 is depressed and valve 119 thereby opened. Pressure fluid is then free to flow from motors 65 in the reverse direction through the conduit means comprising conduits 77, 79 and 81 and through the exhaust circuit previously described. Springs 75 then act to cause piston rods 73 to move a small distance to the rear thereby breaking the linkages comprising links 45 and 49, whereupon coil compression spring 43 moves sleeve 33 a substantial distance to the rear to the broken line position shown in Figure 2, the rollers 31 following downwardly along the inclines of portions 35 and 37 of the outer surface of sleeve 33 under the influence of springs 38 and ring 39. Inasmuch as links 45 and 49 are at or nearly at dead center in the fully expanded position of the device, springs 75 need not be strong and only a small change in operating fluid pressure is necessary to break the linkages. However, the accumulation of pressure fluid in accumulator chamber 93 prevents any such inadvertent malfunction of the device during a welding operation as might spoil the weld.

With expander feet 25 and 27 retracted, a pull on pipe 95 is all that is necessary to roll the device forwardly on rollers 57 and 85 to the next weld location. Should it be desired to work with pipe of larger interior diameter or smaller interior diameter, it is a simple matter to replace sleeve 33 with a similar sleeve of different size. The slots 28 by which arms 23 are pivotally mounted render the arms self-adjusting to such different sizes of sleeve.

In order to insert a further pipe section in position to be welded, it is necessary only to uncouple the attachments of the device adjacent pipe 95, or to withdraw the device, lay up the new pipe section, and reinsert the device.

From a consideration of the foregoing, it will be apparent that all of the initially recited objects of the present invention have been achieved.

Although the present invention has been described in connection with preferred embodiments, it is to be understood that modifications and variations may be resorted to without departing from the spirit of the invention, as those skilled in this art will readily understand.

Such modifications and variations are considered to be within the purview and scope of the invention and of the appended claims.

What is claimed is:

1. Apparatus for aligning contiguous ends of a plurality of end-to-end pipe sections, comprising in combination a central shaft, means for supporting the shaft coaxially within at least one of a plurality of end-to-end pipe sections, a plurality of arms pivotally connected with the shaft adjacent their forward ends and inclined rearwardly radially outwardly of the shaft, a sleeve surrounding and longitudinally slidable on the shaft, the sleeve having an outer surface inclined rearwardly radially outwardly and bearing against radially inner surfaces of rear portions of the arms, a plurality of first links pivotally connected at one end with the rear of the sleeve, a plurality of second links pivotally connected at one end with the shaft, means pivotally interconnecting the other end of each first link with the other end of a second link to form a plurality of linkages, a collar surrounding and longitudinally slidable on the shaft and disposed rearwardly of the pivotal connections of the second links with the shaft, a plurality of third links each pivotally connected at one end with a linkage and at the other end with a collar, and means for selectively urging the collar forwardly.

2. Apparatus for aligning contiguous ends of a plurality of end-to-end pipe sections, comprising in combination a central shaft, means for supporting the shaft coaxially within at least one of a plurality of end-to-end pipe sections, means for applying forces directed radially outwardly about the shaft to interior surfaces of contiguous ends of a pair of end-to-end pipe sections to align the contiguous ends of the pair of sections, the force applying means including portions selectively engageable with the contiguous end interior surfaces, the force applying means comprising a sleeve surrounding and longitudinally slidable on the shaft to actuate the contiguous end interior surface engaging portions of the force applying means upon movement of the sleeve in one direction, a collar surrounding and longitudinally slidable on the shaft to actuate the sleeve upon movement of the collar in the one direction, a plurality of first links pivotally connected at one end with the collar side of the sleeve, a plurality of second links pivotally connected at one end with the shaft between the collar and the sleeve, means pivotally interconnecting the other end of each first link with the other end of a second link to form a plurality of linkages, a plurality of third links each pivotally connected at one end with a linkage and at the other end with the collar, and means for selectively urging the collar toward the sleeve.

3. The invention of claim 2, and means acting between the sleeve and the shaft and between the collar and the shaft to prevent rotation of the sleeve, collar and shaft relative to each other.

4. The invention of claim 2, and an abutment shoulder fixedly connected with the shaft and disposed forwardly of the sleeve, and a coil compression spring encircling the shaft and acting between the abutment shoulder and the forward end of the sleeve.

5. The invention of claim 2, and an abutment ring surrounding and fixedly connected with the shaft and interconnecting the shaft and the second links, the first, second and third links being so disposed that the collar strikes the abutment ring before the first and second links pass over center.

6. Apparatus for aligning contiguous ends of a plurality of end-to-end pipe sections, comprising in combination a central shaft, means for supporting the shaft coaxially within at least one of a plurality of end-to-end pipe sections, means for applying forces directed radially outwardly about the shaft to interior surfaces of contiguous ends of a pair of end-to-end pipe sections to align the contiguous ends of the pair of sections, the force applying means comprising a collar surrounding and longitudinally slidable on the shaft to actuate the remainder of the force applying means upon movement of the collar in one direction, a plurality of fluid motors for urging the collar in the one direction and mounted in unitary assembly with the shaft, means defining a pressure fluid accumulator chamber, a source of pressure fluid for supplying pressure fluid to the chamber, first conduit means defining a fluid path between the chamber and the fluid input for each motor, second conduit means defining a fluid exhaust path for each motor, and means for alternately opening one and closing the other of the first and second conduit means.

7. The invention of claim 6, the shaft being hollow and the interior of the shaft comprising at least a portion of the accumulator chamber.

8. Apparatus for aligning contiguous ends of a plurality of end-to-end pipe sections, comprising in combination a central shaft, means for supporting the shaft coaxially within at least one of a plurality of end-to-end pipe sections, means for applying forces directed radially outwardly about the shaft to interior surfaces of contiguous ends of a pair of end-to-end pipe sections to align the contiguous ends of the pair of sections, the force applying means comprising a collar surrounding and longitudinally slidable on the shaft to actuate the remainder of the force applying means upon movement of the collar in one direction, a plurality of fluid motors for urging the collar in the one direction and mounted in unitary assembly with the shaft, means defining a pressure fluid accumulator chamber, a source of pressure fluid for supplying fluid pressure to the chamber, conduit means extending lengthwise of the shaft and communicating with each motor, a first conduit extending in the one direction beyond the end of the shaft and communicating between the chamber and the conduit means, a second conduit extending in the one direction beyond the end of the shaft and communicating with and providing an exhaust for the conduit means, and means for alternately opening one and closing the other of the first and second conduits.

9. The invention of claim 8, the shaft being hollow, the conduit means extending interiorly of the hollow shaft, and the interior of the shaft comprising at least a portion of the accumulator chamber.

References Cited in the file of this patent

UNITED STATES PATENTS

| | | |
|---|---|---|
| 1,448,528 | Elliott | Mar. 13, 1923 |
| 2,167,896 | Graham et al. | Aug. 1, 1939 |
| 2,289,140 | Mohan | July 7, 1942 |
| 2,525,680 | Ingemarson | Oct. 10, 1950 |
| 2,615,413 | Adams et al. | Oct. 28, 1952 |
| 2,821,946 | Goekler | Feb. 4, 1958 |
| 2,830,551 | Miller | Apr. 15, 1958 |